United States Patent
Burk et al.

(10) Patent No.: US 9,291,374 B2
(45) Date of Patent: Mar. 22, 2016

(54) ADSORBER STRUCTURE AND MODULE FOR A HEAT PUMP

(71) Applicants: BEHR Gmbh & Co. KG, Stuttgart (DE); MAHLE INTERNATIONAL GmbH, Stuttgart (DE)

(72) Inventors: Roland Burk, Stuttgart (DE); Hans-Heinrich Angermann, Stuttgart (DE); Thomas Schiehlen, Altheim (DE); Eberhard Zwittig, Hochdorf (DE); Steffen Thiele, Freital (DE); Thomas Wolff, Muenchberg (DE); Holger Schroth, Maulbronn (DE); Stefan Felber, Schwieberdingen (DE); Steffen Brunner, Weissach im Tal (DE)

(73) Assignee: MAHLE International GmbH, Stuttgart (DE)

( * ) Notice: Subject to any disclaimer, the term of this patent is extended or adjusted under 35 U.S.C. 154(b) by 126 days.

(21) Appl. No.: 14/159,730

(22) Filed: Jan. 21, 2014

(65) Prior Publication Data

US 2014/0130540 A1   May 15, 2014

Related U.S. Application Data

(63) Continuation of application No. PCT/EP2012/064167, filed on Jul. 19, 2012.

(30) Foreign Application Priority Data

Jul. 21, 2011   (DE) .................. 10 2011 079 581

(51) Int. Cl.
   F25B 17/00    (2006.01)
   F25B 17/08    (2006.01)
   F25B 37/00    (2006.01)

(52) U.S. Cl.
   CPC ............. *F25B 17/00* (2013.01); *F25B 17/08* (2013.01); *F25B 37/00* (2013.01); *Y02B 30/62* (2013.01); *Y02B 30/64* (2013.01)

(58) Field of Classification Search
   CPC .......... F25B 17/00; F25B 17/08; F25B 37/00; Y02B 30/64; Y02B 30/62
   USPC ................................... 62/477, 478
   See application file for complete search history.

(56) References Cited

U.S. PATENT DOCUMENTS 5,310,439 A * 5/1994 Matsui ................. C08G 59/306
                                                    156/307.3
5,388,637 A   2/1995 Jones et al.
5,585,145 A * 12/1996 Maier-Laxhuber .... B01J 20/183
                                                    165/104.12

(Continued)

FOREIGN PATENT DOCUMENTS

DE          44 05 669 A1    8/1995
DE    11 2004 000 878 T5    4/2006

(Continued)

*Primary Examiner* — Mohammad M Ali
(74) *Attorney, Agent, or Firm* — Muncy, Geissler, Olds & Lowe, P.C.

(57) ABSTRACT

An adsorber structure for a heat pump, having at least one pipe, through which a heat-transfer fluid can flow, and an adsorption medium, wherein a working medium can be adsorbed and desorbed on the adsorption medium and the adsorption medium is in thermal connection with the pipe, wherein the adsorption medium is designed as at least one, in particular several, molded bodies, which is/are directly adjacent to a pipe wall of one of the pipes.

21 Claims, 8 Drawing Sheets

(56) References Cited

U.S. PATENT DOCUMENTS

| | | | |
|---|---|---|---|
| 6,973,963 B2 | 12/2005 | Dunne et al. | |
| 7,065,981 B2 * | 6/2006 | Ebbeson | F24F 5/0014 165/104.12 |
| 7,251,955 B2 * | 8/2007 | Henning | F25B 17/08 62/101 |
| 7,456,131 B2 * | 11/2008 | Klett | B01J 20/183 502/417 |
| 8,770,267 B2 * | 7/2014 | Nagashima | B22F 3/11 165/104.34 |
| 2002/0070002 A1 * | 6/2002 | Ohgami | F24F 3/1423 165/10 |
| 2005/0061023 A1 * | 3/2005 | Ebbeson | F24F 5/0014 62/480 |
| 2005/0199233 A1 * | 9/2005 | Butler | F24B 1/1881 126/523 |
| 2006/0101847 A1 * | 5/2006 | Henning | F25B 17/08 62/480 |
| 2007/0111003 A1 * | 5/2007 | Chen | C23C 14/025 428/408 |
| 2008/0051279 A1 * | 2/2008 | Klett | B01J 20/183 502/60 |
| 2008/0078532 A1 | 4/2008 | Nagashima et al. | |
| 2008/0274345 A1 | 11/2008 | Fuesting et al. | |
| 2012/0090345 A1 | 4/2012 | Angermann et al. | |

FOREIGN PATENT DOCUMENTS

| | | |
|---|---|---|
| DE | 10 2009 043 515 A1 | 4/2011 |
| JP | H 10-185353 A | 7/1998 |
| JP | 2004-317011 A | 11/2004 |
| WO | WO 03/087682 A1 | 10/2003 |
| WO | WO 2006/097493 A2 | 9/2006 |
| WO | WO 2010/112433 A2 | 10/2010 |

* cited by examiner

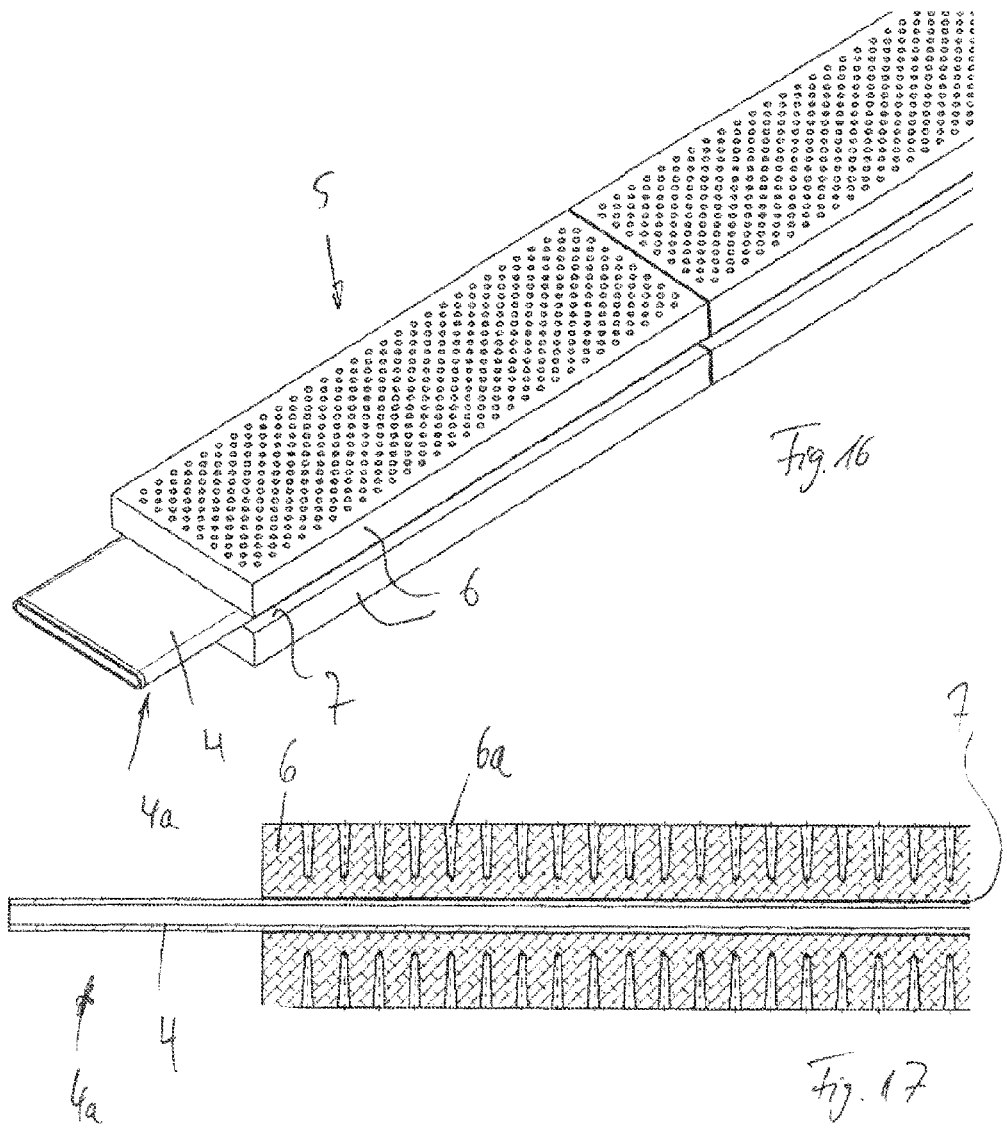

1

ADSORBER STRUCTURE AND MODULE FOR A HEAT PUMP

This nonprovisional application is a continuation of International Application No. PCT/EP2012/064167, which was filed on Jul. 19, 2012, and which claims priority to German Patent Application No. DE 10 2011 079 581.2, which was filed in Germany on Jul. 21, 2011, and which are both herein incorporated by reference.

BACKGROUND OF THE INVENTION

1. Field of the Invention

The present invention relates to an adsorber structure and a module with an adsorber structure of the invention and a molded body with an adsorption medium.

2. Description of the Background Art

WO 2010/112433 A2, which corresponds to US 20120090345, which is incorporated herein by reference, describes a heat pump, which has a stack of hollow elements, in each of which an adsorption/desorption zone and a condensation/evaporation zone are disposed. The hollow elements are each filled with a working medium, which can be moved between the two regions. An adsorption medium is applied to sheets, which have passages for feeding through pipes.

SUMMARY OF THE INVENTION

It is therefore an object of the present invention to provide an adsorber structure for a heat pump, which can be used especially effectively.

A direct heat transfer from the fluid through the pipe wall to the molded body is achieved by the design of the adsorption medium as a molded body directly adjacent to the pipe wall. Furthermore, this can simplify the structural design, save space and construction costs, and increase the effectiveness overall.

Direct adjacency within the meaning of the invention can be understood as the geometrically direct attachment of the molded bodies to the form of the pipes. Depending on the detailed design, one or more other layers may be present between a bearing material of the pipe walls and the molded bodies, for example, an adhesive, a heat-conducting medium, a corrosion protection layer, and/or another coating, e.g., for the purpose of soldering.

A preferred, but not necessary working medium for adsorption and desorption can be methanol. The adsorption medium can be based on activated charcoal.

In an embodiment, the molded body can have a thickness of at least about 1 mm, preferably of at least about 2 mm. Such relatively great thicknesses enable a high utilization of the available space with a sorption-active material at a still justifiable effectiveness of the overall structure. A top limit for the thickness of the molded body structures in this sense can be about 10 mm and especially preferably about 6 mm.

An embodiment of the invention provides that the molded body can be connected to the pipe wall by means of an elastic adhesive layer. The adhesive layer can have a silicone base, as a result of which a good elasticity is achieved at a simultaneously high heat resistance and chemical resistance. In a further embodiment, polysulfone-based adhesives may also be used.

Preferably, but not necessarily, the adhesive layer moreover has additives to increase thermal conductivity. These may be, for example, boron nitride and/or finely ground graphite and/or carbon black.

The thickness of the adhesive layer can be ≤0.5 mm, preferably ≤0.3 mm, and especially preferably ≤0.2 mm.

The adhesive layer can have an at least short-term temperature stability of about 250° C., so that an at least single complete adsorber desorption is made possible, for example, during an initial installation. A long-lasting resistance of the adhesive layer to the working medium, particularly methanol, exists to at least about 130° C.

The adhesive layer can be selected so that there is an elongation at break or elongation at rupture of at least about 200%, preferably about 300%. As a result, spalling of the molded bodies from the pipe wall at greater temperature changes is prevented.

In another embodiment of the invention, it is provided that at least one of the plurality of molded bodies lies against the pipe wall of the pipe under the action of force, preferably frictionally. In this way, fixing by material bonding or gluing is avoided, so that different thermal expansions can be optimally compensated. The retaining under the effect of force brings about a defined, high heat transfer.

In an embodiment, at least one of the two, pipe or molded body, can have a substantially wedge-shaped cross section, whereby particularly at least one of the two is held in a wedge direction under the action of force. Preferably, in this case flat wedge angles of a few degrees are selected.

Basically, an adsorber structure of the invention can comprise molded bodies that are held by material bonding and purely by force.

In an embodiment, the pipe can be formed as a flat pipe, whereby the molded body can be adjacent to the broad sides of the flat pipes. Flat pipes can be manufactured simply and cost-effectively and have large areas for heat transfer. Basically, all known structural shapes of flat pipes are conceivable for use, for example, welded and/or soldered pipes, pipes with a flange weld, snap-over pipes, and/or B-type pipes.

In a further embodiment, the pipe can be formed substantially as a round pipe or polygon pipe, whereby the pipe can be embedded by two or more molded bodies. Such a structural form makes possible a largely dense stacking in two spatial directions, which is especially conducive to the utilization of the available space. In an embodiment, the molded bodies, embedding the pipe, overall can have a polygonal, particularly hexagonal outer contour, so that a substantially geometrically dense stacking is achievable.

In an embodiment, the molded bodies can be formed substantially plate-shaped, whereby they each have a number of indentations for the partial enclosing of a number of pipes. Good space utilization with a few individual parts can be achieved in this way.

The molded body can have a recess, which forms at least in part a vapor channel for the adsorption medium and/or a predetermined breaking point of the molded body. Thus, in a spatially dense arrangement of adjacent molded bodies an effective supplying and removing of the working medium through the channels is also provided. The alternative or supplementary function as a predetermined breaking point enables a defined breaking, for example, due to a locally too high thermal expansion. The mechanical and thermal integrity of the overall structure is retained in this case and the function is improved by newly formed micro-flow channels and working medium admission surfaces in or out of the adsorber structure. It is also possible to break the predetermined breaking point even before operation in order to open other working medium diffusion paths in the adsorber structure.

The pipe can be made substantially out of an iron-based alloy. Such alloys are especially robust to many working media, particularly methanol. Aluminum-based materials may also be used, however, for other working media such as, for example, water.

The pipe can be made of a ferritic stainless steel (low coefficient of expansion) and/or tinned ferritic stainless steel. It can also have tinned stainless steel or steel, for instance, of economic tinplate. A further variant is to use a galvanized base material, particularly galvanized steel. It is also possible to use low-alloy stainless steel or steel such as, e.g., DC03. The last two materials are resistant to dry methanol.

A hydraulic diameter in the design as flat pipes can be less than about 5 mm, preferably in the range between 1 mm and 2 mm.

The wall thicknesses of the flat pipes can be in the range of 0.1 mm to 1 mm, preferably between 0.2 and 0.4 mm.

When designed as round pipes, these can have a diameter in the range between 4 mm and 6 mm. The round pipes can have wall thicknesses in the range between 0.05 mm and 0.5 mm and preferably between 0.1 mm and 0.3 mm.

In an embodiment, a module for a heat pump can include an adsorption/desorption region, whereby a bundle of fluid-traversable pipes is disposed in the region and a housing sealingly encloses the pipe bundle and a working medium, and the module in its adsorption/desorption region has an adsorber structure of the invention according to any one of claims 1 to 13.

In an embodiment, a condensation/evaporation region can be provided in the housing, in which a bundle of fluid-traversable pipes is disposed, whereby the working medium can be moved between the adsorption/desorption region and the condensation/evaporation region. A plurality of such modules can be combined to form a heat pump of the invention, for example, according to the teaching of WO 2010/112433 A2.

If the module does not comprise a condensation/evaporation region, for example, use as an adsorptive heat and/or cold accumulator or in a classic adsorption/heat pump concept with a plurality of adsorption reactors, but a common condenser and evaporator can be provided.

In an embodiment, a support structure forms a mechanical support of a wall of the housing against the action of an external pressure. In general, in such a module at least under certain operating conditions a negative pressure with respect to the environment predominates, which imposes special requirements on the design of the housing. The externally acting pressure forces can be effectively absorbed and/or distributed by the support structure. Such a support structure can be formed, for example, as a trapezoidal sheet, which comprises longitudinal folds oriented transverse to longitudinal beads provided in a housing cover. Alternative detailed designs of the support structure are possible, for example, as a grid, a plurality of rods, T-profiles, and so forth.

In an embodiment of the module, the adsorber structures are formed as mechanical support for the housing, which results in an especially high strength to withstand external pressure. In this case, at the same time a spatially especially dense arrangement of the molded bodies and pipes is utilized.

The housing wall of the module can be made of an iron-based alloy, for example, steel, stainless steel, tinned or galvanized steel, or the like. In particular, the material can correspond to a material of the pipes, therefore when using working media other than methanol, also of aluminum-based materials.

In an embodiment, in the evaporation/condensation region there is no support by the inner pipes and structures connected to them for the addition and release of the working medium. Because this region usually has a lower expansion than the adsorption region, the mechanical stability is not substantially affected. In particular, preferably in this case a support frame can be provided in the interior of the housing between the two regions and/or within one of the two regions.

In a preferred module, the adsorption/desorption region occupies a larger portion of the module than the evaporation/condensation region. Especially preferably, the ratio of the volumes used by these regions in each case within the housing during use of liquid heat transfer medium is between about 2 and about 4.

A molded body of the invention with an adsorption medium for a heat pump can include a mixture, comprising an adsorption medium and a binder, which comprises a ceramic binder. The ceramic binder is based preferably, but not necessarily, on silicate ceramics. Especially preferably, these can comprise aluminosilicates.

The mixture contains advantageously a powder of a sorption-active base material in a particle size in the range between 2 μm and 500 μm, preferably between 5 μm and 100 μm. The sorption-active base material can be, for example, activated charcoal.

The mixture may contain auxiliary materials for improving heat conduction, for example, expanded graphite and/or boron nitride and/or silicon carbide and/or aluminum nitride and/or a carbon black and/or metallic particles. The additives in their sum total preferably have a percentage by weight, based on the mass of the molded body, between 5% and 50%, especially preferably between 10% and 35%.

Alternatively or in addition, inorganic fibers can be mixed in, which improve the thermal conductivity and/or mechanical stability.

In an embodiment, activated carbon fibers are mixed in, which advantageously comprise a heat conduction function and/or mechanical stabilization, and also can perform an adsorption function.

A production process for the molded body of the invention can comprise, e.g., extrusion, drying, and/or sintering. The sintering can occur under an inert gas.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein:

FIG. 16 shows an adsorber structure, placed on a flat pipe, with a blind hole perforation; and FIG. 17 shows a section through the adsorber structure, provided with blind holes, according to FIG. 16.

DETAILED DESCRIPTION

Figure 1:
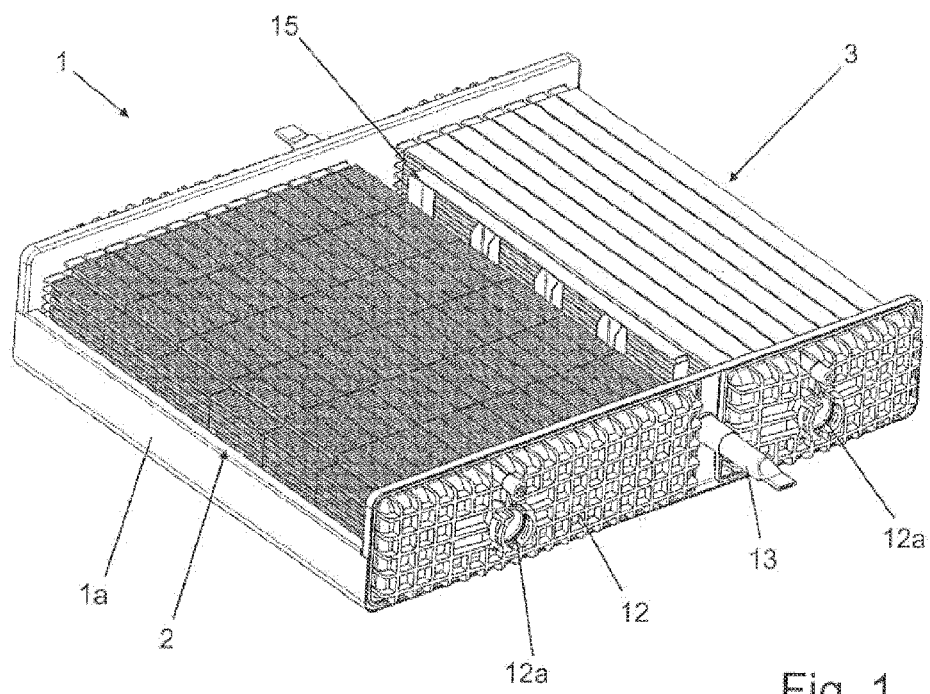
FIG. 1 shows a spatially open view of a module with adsorber structures according to the invention.
Figure 2:
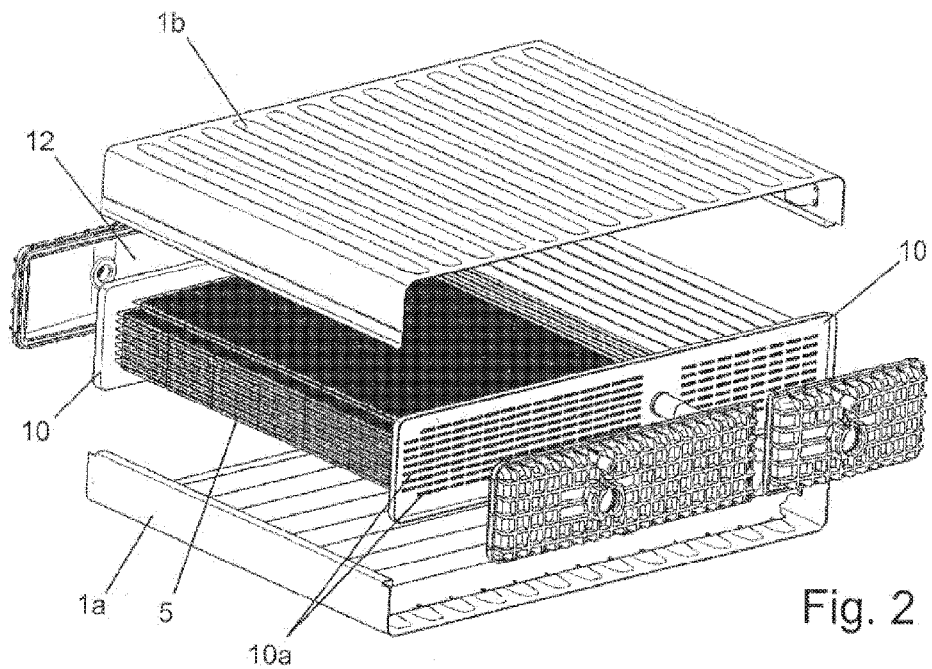
FIG. 2 shows the module of FIG. 1 in an exploded diagram.

The module shown in FIG. 1 is one of a plurality of connected modules of a heat pump. It comprises a housing 1 in which a first region as adsorption/desorption region 2 and a second region as condensation/evaporation region 3 are disposed next to one another. Each of regions 2, 3 comprise a plurality of pipes 4 (see FIG. 5, FIG. 16, FIG. 17), flat pipes in the present case, which are arranged stacked as bundles in two spatial directions.

Figure 5:
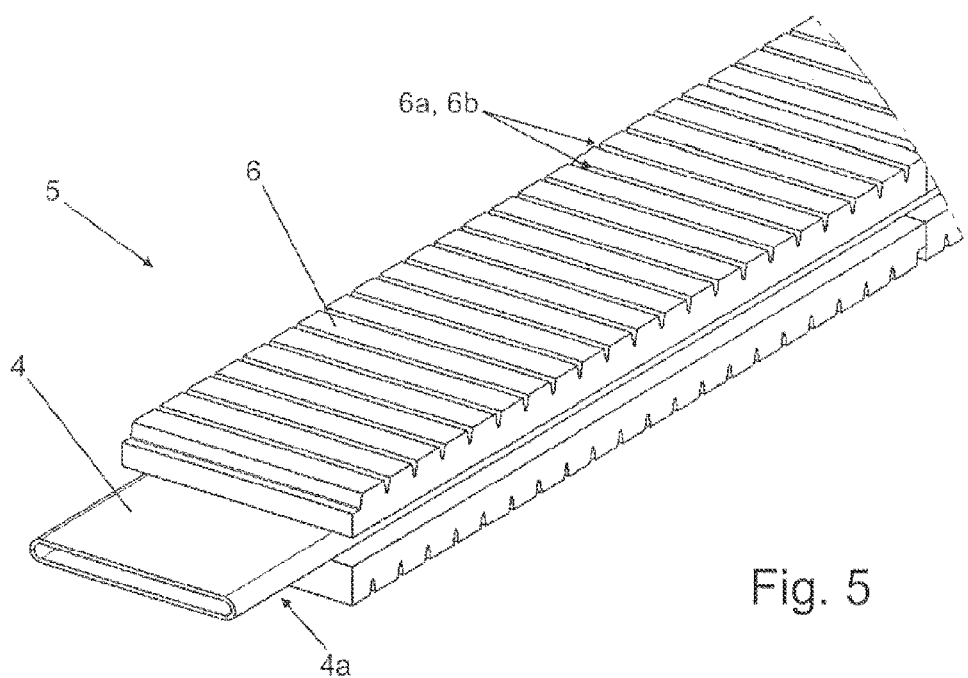
FIG. 5 shows a spatial view of a first exemplary embodiment of an adsorber structure of the invention with mounting by material bonding.

Pipes 4 of the first region are each formed here as an adsorber structure 5 (see FIG. 5). In this regard, the broad sides of flat pipes 4 are each connected to a molded body 6 in a planar manner, by gluing in the present case. Molded body 6 has a mixture of adsorption media, activated charcoal in the present case, and binder.

Figure 6:
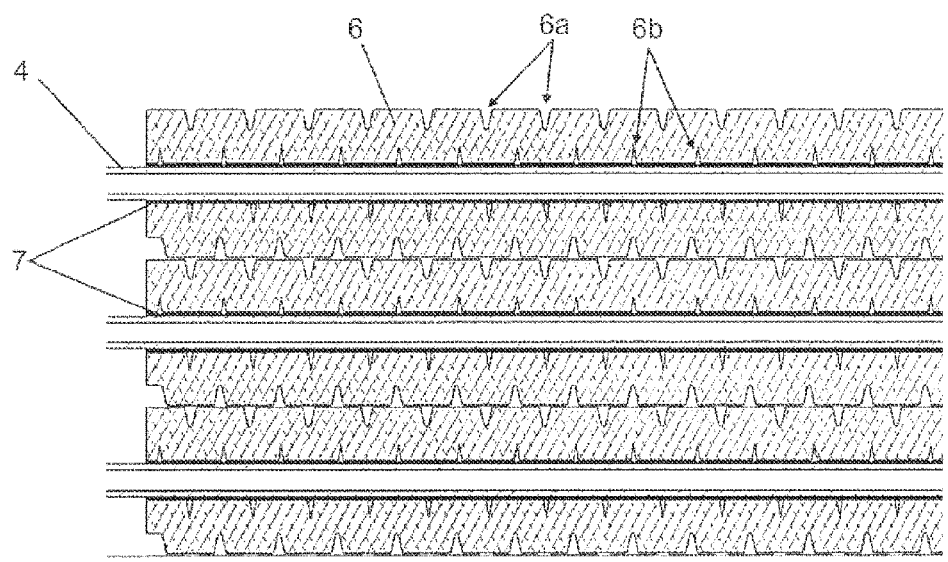
FIG. 6 shows a sectional view through a stacked arrangement of a number of adsorber structures from FIG. 5.
Figure 7:
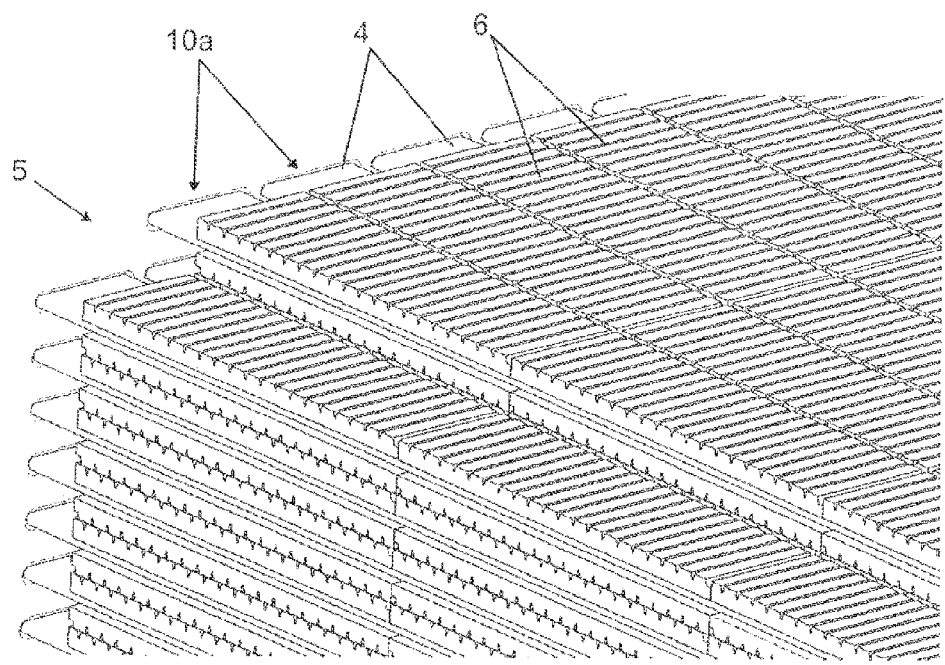
FIG. 7 shows a spatial view of adsorber structures from FIG. 5 stacked in two spatial directions.

An adhesive layer 7 (see FIG. 6) for connecting molded body 6 to pipes 4 comprises an elastic adhesive with a silicone base.

In the molded bodies groove-like and/or blind hole-like recesses 6a, 6b are formed, which serve as vapor channels 6a for the collective supplying and removing of the working medium and/or predetermined breaking points 6b, by which spalling of the molded bodies from pipe 4 during excessive thermomechanical strain is prevented.

Pipes 4 in end regions 4a extend beyond molded bodies 6 and open into passages 10a of pipe bases 10.

Figure 8:
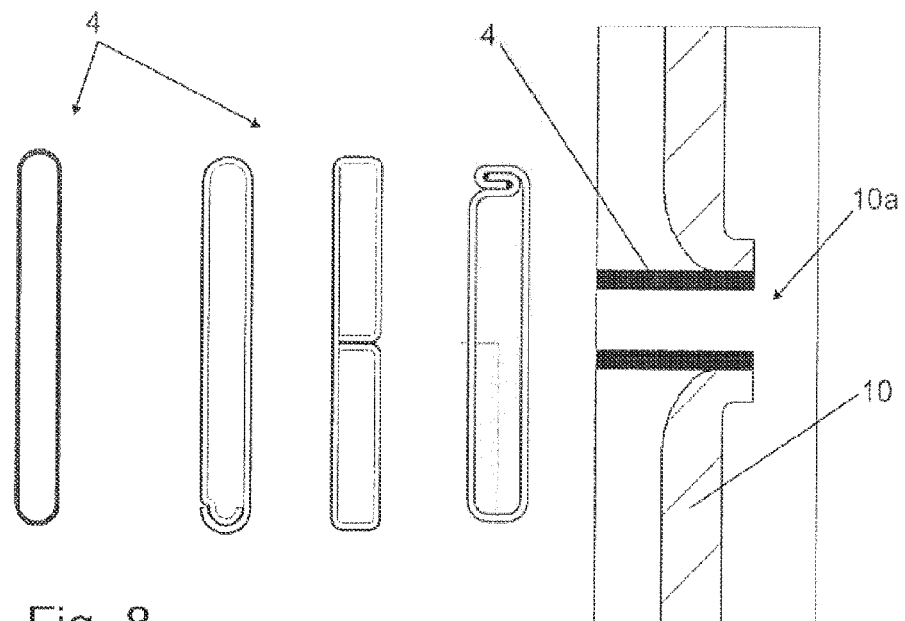
FIG. 8 shows sectional views of a number of structural shapes of flat pipes of the adsorber structures from FIG. 5 to FIG. 7 and a sectional view of a flat pipe inserted in a pipe base.

Flat pipes 4 can be formed in any manner, for example, according to FIG. 8 as a laser longitudinally welded pipe, snap-over pipe, B-type pipe, or flanged pipe (from left to right).

Figure 9:
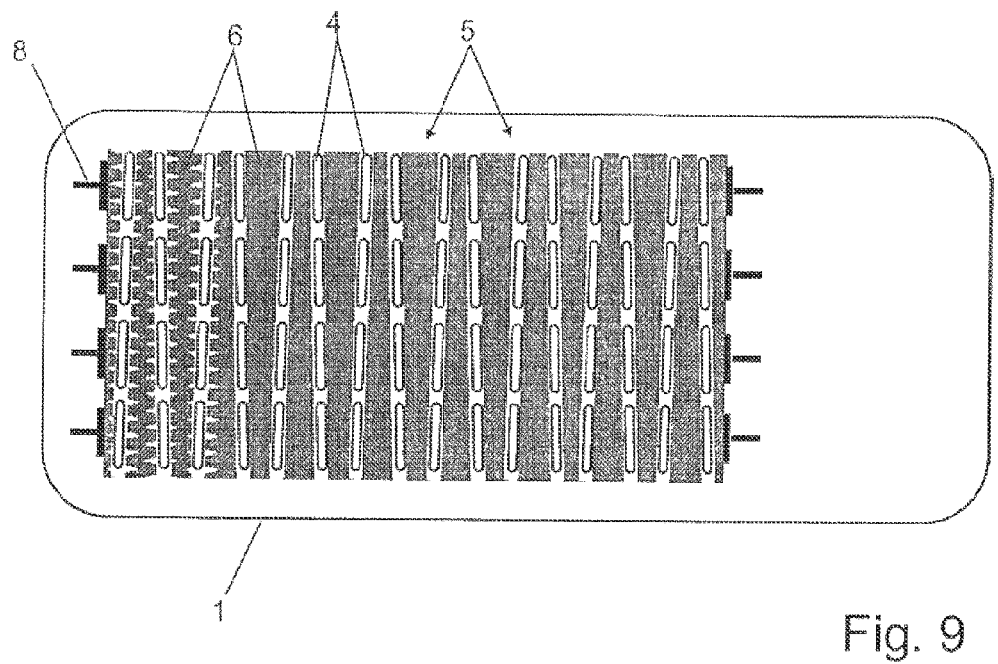
FIG. 9 shows a schematic sectional view of a further embodiment of adsorber structures with force-fitted mounting.
Figure 10:
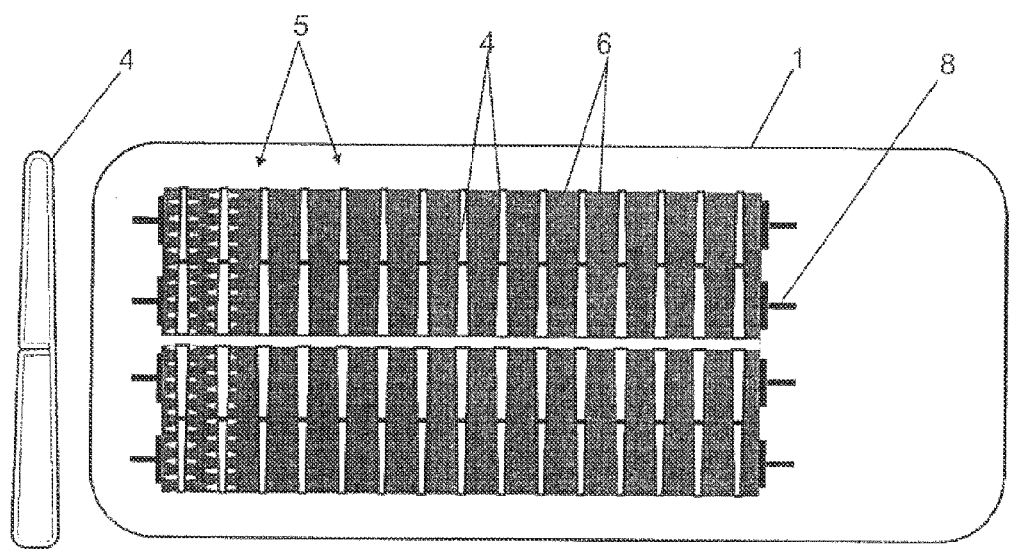
FIG. 10 shows a variation of the embodiment in FIG. 9 with wedge-shaped flat pipes.

FIG. 9 and FIG. 10 show embodiments with flat pipes 4, in which molded bodies 6 are not glued or attached by material bonding, but force-fitted, frictionally in the present case.

In the example according to FIG. 9, the molded bodies are formed slightly wedge-shaped and the flat pipes are formed conventionally. Each molded body 6 extends in a depth direction over a number of flat pipes 4. The orientations of molded bodies 6 alternate in the longitudinal direction or stack direction.

In the example according to FIG. 10, both molded bodies 6 and flat pipes 4 are formed slightly wedge-shaped. In this variation, a molded body extends over a flat pipe, whereby rows of flat pipes behind another in the depth direction are shown in the reverse orientation. Preferably (not shown in FIG. 10) the molded bodies project, as also in FIG. 9, in the depth direction beyond the flat pipes, so that the molded bodies are held by support means or elastic force-providing means (not shown) in the wedge direction. In the stack direction, at the end sides hold elements 8 are provided, which support at least the end-side molded bodies statically or elastically under the action of force in this direction. At least one part of the supporting force in the stack direction can also be absorbed by pipes 4 taken up in passages. Additional supporting forces can be taken up by tension bands, tie rods, or the like between the hold elements, which is not shown in the figures, however.

Figure 11:
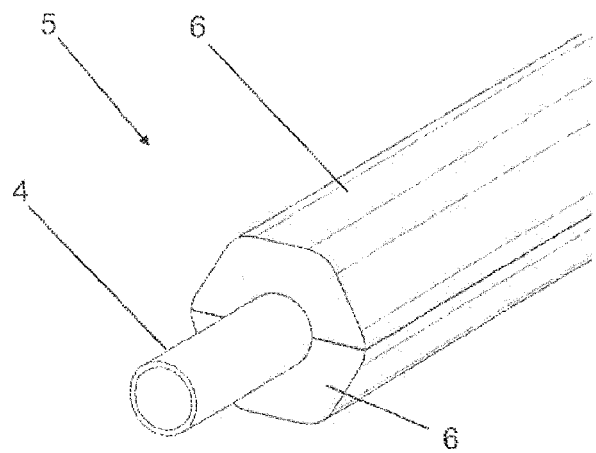
FIG. 11 shows a spatial diagram of a further example of an adsorber structure of the invention with a round pipe.

In the exemplary embodiment according to FIG. 11, there are round pipes 4 instead of flat pipes; depending on the variation these can also be made polygonal.

Round pipes 4 are each surrounded in part by a plurality of molded bodies 6, two in the present case. Molded bodies 6 embed pipe 4 completely overall (except for a tolerance and/or adhesive gap), whereby they all have a hexagonal outer contour in the present case. As a result, adsorber structures 5, having one pipe 4 and two molded bodies 6, can be stacked in tight packs in two spatial directions (see FIG. 12).

The preferred thickness of molded bodies 6 results from the average length of the heat conduction path, for which purpose the same data apply to all designs (preferably between 1 mm and 10 mm, especially preferably between 2 mm and 6 mm).

It is evident that the edges of the outer contour of the molded bodies are definitely rounded, so that vapor channels 6a are formed in the stack in each case.

Figure 12:
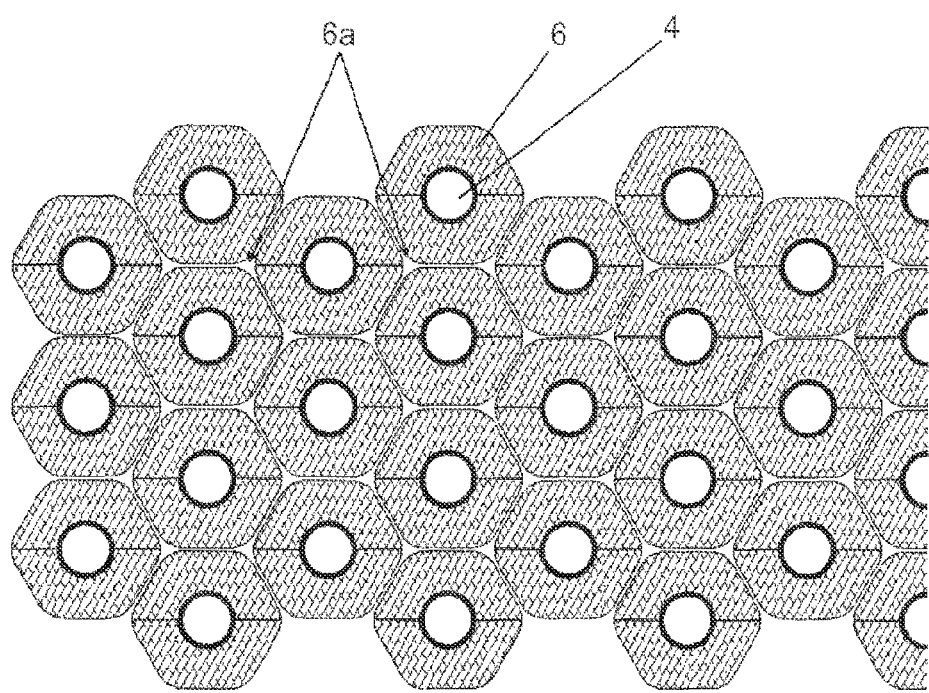
FIG. 12 shows a stack of adsorber structures according to FIG. 11 in two spatial directions.

Depending on the requirements, the example according to FIG. 11 and FIG. 12 can be formed with material and/or force-fitting connection of molded bodies 6 to pipes 4. In regard to the preferred material connection, the same adhesive system can be used as in the other exemplary embodiments.

Figure 13:
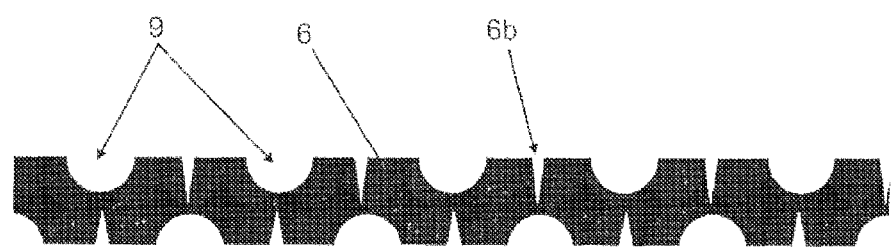
FIG. 13 shows a plate-shaped molded body of a further embodiment of an adsorber structure.
Figure 14:
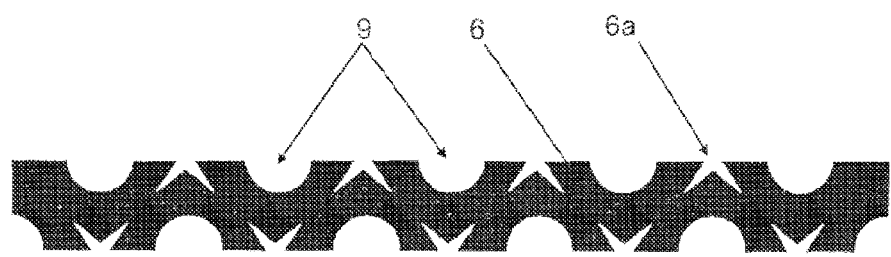
FIG. 14 shows a variation of the molded body of FIG. 13.
Figure 15:
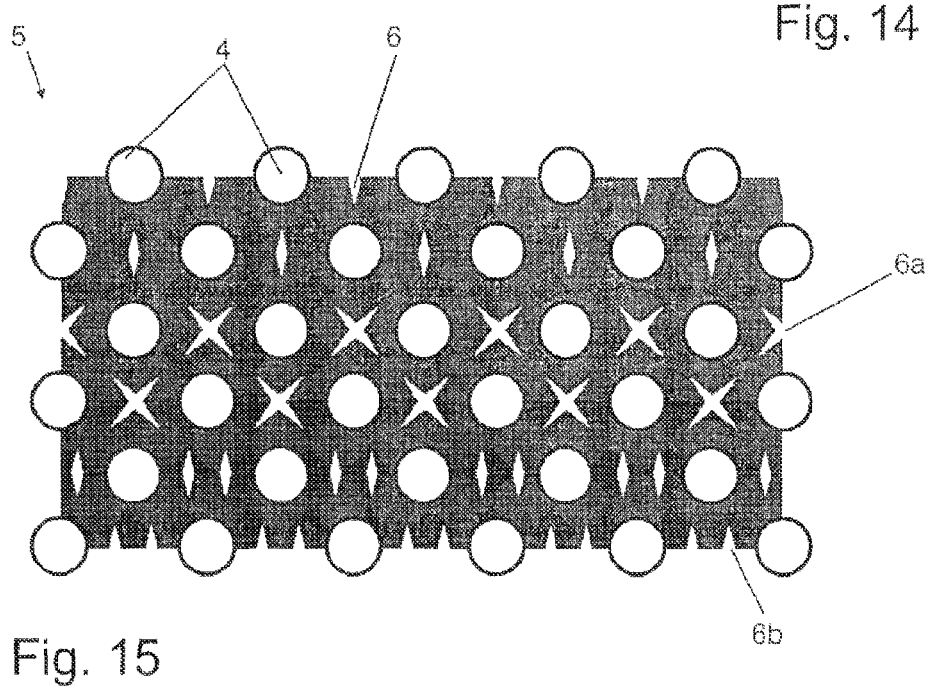
FIG. 15 shows an adsorber structure with round pipes and molded bodies according to FIG. 13 and FIG. 14.

In the example according to FIG. 13 to FIG. 15, molded bodies 6 are formed substantially plate-shaped, whereby each of plates 6 have a number of indentations 9 for the partial enclosing of pipes 4. The pipes are round pipes in the present case but not necessarily.

Molded bodies 6 each have recesses 6a, 6b to form vapor channels and predetermined breaking points. It is understood that a recess 6a, 6b can also fulfill both functions concurrently. Preferably, these are realized and disposed either in the neutral area of the heat flow and/or as a narrow gap in the heat flow direction.

Figure 3:
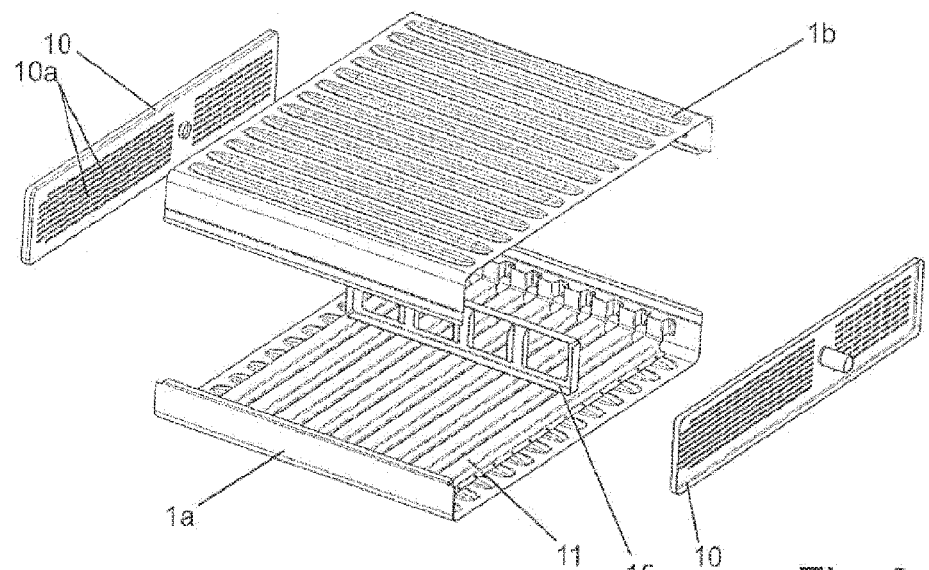
FIG. 3 shows an exploded diagram of housing parts of the module of FIG. 1.
Figure 4:
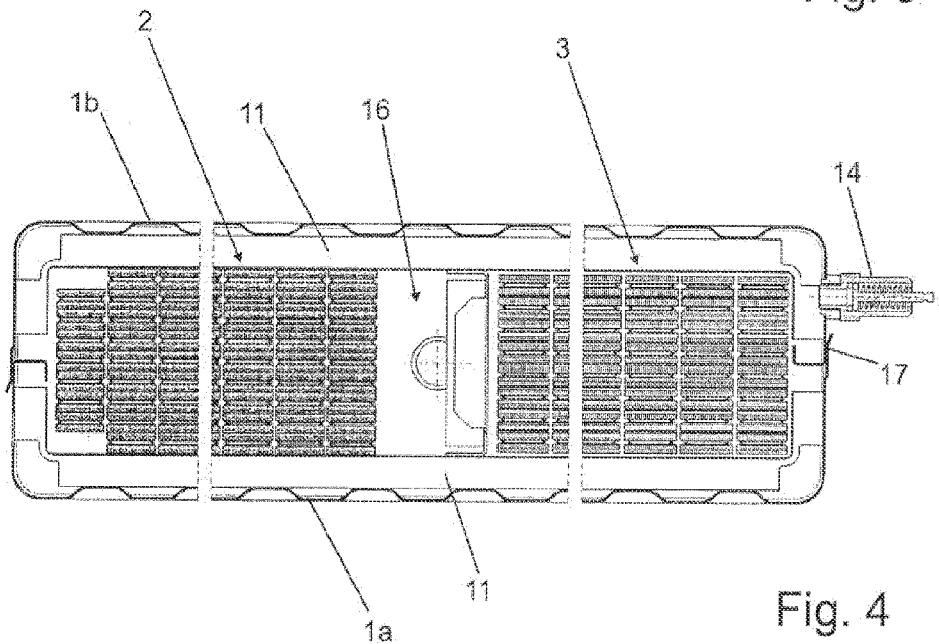
FIG. 4 shows a schematic sectional view through the module of FIG. 1.

FIG. 15 shows an adsorber structure 5, which comprises a stack of a number of the molded bodies according to FIG. 3 and FIG. 4 with rows of round pipes 4 arranged between them.

In general, the above-described adsorber structures preferably have the following properties:

The pipes of the bundle are connected to the molded bodies with good heat conduction, whereby the projections on the end sides extend from 5 mm to 15 mm.

The pipes of the pipe bundle can include a base material—Fe-base material, especially preferably ferritic stainless steel such as, for example, 1.4509 or 1.4512. This possesses lower thermal expansion coefficients than austenitic stainless steel.

Alternatively, tinned stainless steel, tinned steel (tinplate), or low-alloy steel such as, e.g., DC03, and stainless steel may also be used as the pipe material, depending on the selected joining process. A further variant is to use a galvanized base material, particularly galvanized steel.

Flat pipes 4 (FIG. 5 to FIG. 10) have a hydraulic diameter of <5 mm, preferably in the range between 1 and 2 mm. The wall thicknesses of the flat pipes are in the range of 0.1 mm to 1 mm, preferably between 0.2 mm and 0.4 mm.

The round pipes (FIG. 11 to FIG. 15) preferably have a diameter in the range between 4 and 6 mm. Round pipes 4 have wall thicknesses in the range between 0.05 mm and 0.5 mm, preferably between 0.1 mm and 0.3 mm.

The molded bodies in the above-described exemplary embodiments have particular preferred features according to the following examples or are produced preferably in the following manner:

Example 1

Use of a highly porous adsorbent in powder form as the adsorption-active base material for the adsorption of methanol with the following properties: Preferably having a type 1 adsorption isotherm for the adsorption of methanol.

Adsorber compound including: Powder of the sorption-active base material with a particle size in the range between 2 μm and 500 μm, preferably between 5 μm and 100 μm. Ceramic binder based on silicate ceramics such as, e.g., magnesium silicates (example steatite), magnesium aluminum silicates (example cordierite), and aluminosilicates (examples earthenware, porcelain). The proportion by weight of the ceramic binder in the molded body is between 5% and 50%, especially preferably between 15% and 30%. Heat-conducting additives, particularly expanded graphite, carbon black, BN, SiC, AlN, metallic particles, and mixtures thereof in a percentage by weight between 5% and 50%, preferably from 5% to 35%. Optionally inorganic fibers for mechanical structural reinforcement and increasing the thermal conductivity. Optionally activated carbon fibers, which both have sorptive properties and can also assume a heat-conducting function.

Molded bodies may be produced from adsorber compound by the following methods:

Variant 1: Preparation of a plastic mass having the components listed above under 1 and 2 and water and a plasticization aid. Extrusion, e.g., to a film or to a strand, which is rolled into a film, with subsequent optional introduction of blind holes and subsequent cutting. Alternatively extrusion to a film with the already provided profile and subsequent cutting into strips. Drying, as required with measures for form retention. Sintering under an inert gas at a temperature and holding time necessary for the hardening or sintering of the ceramic binder to form a stable matrix.

Variant 2: Preparation of a granular material having the components listed above and an additive (e.g., a wax), which after a compression process assumes the function of a green binder. An example of such a production process is the production of spray granules. Filling of the granular material into a form and molding into the shape of the adsorber structure. Sintering under an inert gas at a temperature and holding time necessary for the hardening or sintering of the ceramic binder to form a stable matrix. To set a specific porosity and a defined pore structure, optionally a pore former, e.g., in the form of powdered polymers or in the form of organic fibers, can be added to the starting mixture. This refers to both of the mentioned production variants.

The following features may be provided for the geometric design of the molded bodies:

A plate shape with an average thickness in heat transport direction in the range between 1 mm and 10 mm, preferably in the range between 2 and 6 mm.

One- or two-sided groove structure with a groove distance that correlates by a factor between 0.5 and 2 with the plate thickness.

A groove depth that correlates by a factor between 0.2 and 0.8 with the plate thickness. A groove width <1 mm, preferably <0.5 mm.

Blind hole structure introduced on one side to increase the vapor admission surface with a simultaneous shortening of the diffusion paths of the working medium vapor. Preferably, the surface/volume ratio of the adsorber structure is increased by one of the measures by at least a factor of 1.5, preferably by at least a factor of 2.

Preferably the following features are present for adhesive layer 7 for binding molded bodies 6 to pipes 4: Elastic adhesive layer characterized by: full surface wetting of both the adsorption body surface and the surface of the metal support; short-term temperature stability to 250° C. for the purpose of adsorber desorption before an installation; long-lasting resistance to the working medium, preferably methanol, to 130° C.; as required enrichment with heat conducting aids such as BN, finely ground expanded graphite, or carbon black; elongation at break (elongation at fracture) at room temperature is at least 300%; and a layer thickness of the adhesive layer is between 10 μm and 500 μm, preferably between 50 μm and 150 μm.

The heat transfer fluid flowing through pipes 4 can be selected as desired, but preferably it is a water/propylene glycol mixture.

The module shown in FIG. 1 to FIG. 4 for a heat pump has in its first region 2 preferably, but not necessarily, adsorber structures according to one of the above-described exemplary embodiments. Any evaporation/condensation structures can be disposed in the second region 3, but preferably structures according to the publication EP 1 918 668 B1.

Housing 1 of the module comprises a bottom housing part 1a and a top housing part 1b, each of which have stamped-in longitudinal beads in a first direction (flow direction) for reinforcement.

Housing 1 comprises moreover bases 10 with passages 10a in which pipes 4 are inserted. The edges of the bases are surrounded by both housing parts 1a, 1b in a hermetically sealing manner.

Support structures 11 are provided in each case between housing parts 1a, 1b and the first and second regions 2, 3. Support structures 11 are made planar, in the present case as trapezoidal sheets (see particularly FIG. 2 and FIG. 3). A fold of trapezoidal sheet 11 is oriented perpendicular to the longitudinal beads of housing parts 1a, 1b and the trapezoidal sheets lie against housing parts 1a, 1b from the inside. They can be fastened to the housing parts (e.g., spot-welded) or rest on them merely frictionally.

The crossing over of the longitudinal beads and the folds results in a high pressure stability of the housing walls, particularly to excess external pressure, and a good thermal decoupling between the internal structures and the housing parts.

The stacked adsorber structures 5 in the first region represent a further support. At least at operating temperatures and/or under the effect of corresponding pressures (assembly with minimal necessary play), molded bodies 6 are adjacent to one another in the vertical direction and to the trapezoidal sheets, so that optimal support against the usually higher external pressure results.

Bases 10 are provided on the outside with water boxes 12 made of plastic (FIG. 1), as is known in principle from heat exchanger construction. Water boxes 12 have connections 12a for supplying and removing heat transfer fluid.

Connections 13 for filling the module with working medium, in the present case methanol, are provided in bases 10. In the diagram according to FIG. 4, a connection 14 is formed as a pressure relief valve with an actuatable valve stem. In this way, increased operational safety and/or multiple fillings of the module can be achieved.

A further support frame 15 is disposed in the module between the first region 2 and the second region 3 (FIG. 3) in order to improve further the mechanical stability particularly in the vicinity of second region 3. In general, in contrast to adsorber structures 5 of first region 2, it is not provided that the active structures for evaporation and condensation of the second region abut one another in the manner of a mechanical support.

Preferably the following features apply to the structure of the module and especially of housing 1:

Both pipe bundles of regions 2, 3 open at the ends into pipe bases 10 and are connected by material bonding therewith. The pipe bases have the following features:

Slightly heat-conducting metal base material, preferably austenitic stainless steel 1.4301 or 1.4404. A thickness range for the pipe base is between 0.3 mm and 1.5 mm, preferably between 0.5 and 1 mm. Depending on the employed pipe production type and joining process, tinned or galvanized base materials may also be used.

The pipe base lead-throughs are spaced apart for thermal decoupling of the two regions 2, 3 depending on the thermal conductivity of the pipe bases is provided (adiabatic zone 16).

Pipe bases 10 have formed pipe passages 10a and with an optional coating, which is matched to the employed pipe type and the realized fluid-tight joining process.

A fluid-tight pipe-base connection can be produced by remote laser beam welding, by: hole punching and embossing of a collar of the same height (FIG. 8); use of a longitudinally laser-welded pipe (FIG. 8); as required flanged seam welding on the face side; and/or laser beam welding in the heat-conducting region;

Alternatively or in addition, a fluid-tight pipe-base connected can be achieved by soft soldering, by: use of a pipe shown in FIG. 8, preferably however a B-type, snap-over, or flanged pipe; gap widths between 0 mm and 0.5 mm; use of either uncoated base materials and use of a flux or use of coated base material and avoidance of flux; In soft soldering without a flux, an employed stainless steel should not be Ti-stabilized; and/or joining by dip, wave, beam, hot gas, induction, and/or by furnace soldering of base materials pre-coated with solder.

Alternatively or in addition, a fluid-tight pipe-base connection can be achieved by gluing, by: use of flat pipes (FIG. 8), wedge-shaped flat pipes (FIG. 10), or round pipes (FIGS. 11 to 15); use of a suitable adhesive; and/or glue joint <0.2 mm.

Housing 1 of the hollow element can have: base material of stainless steel, preferably austenitic; shell construction with two housing parts 1a, 1b having: longitudinal beads, in the direction of the longitudinal axes of the pipes, running to the edge; even edge for fluid-tight welding connection to pipe bases 10 by flanged seam welding; and/or U-shaped fold at one of the longitudinal edges (for longitudinal edge reinforcement and spray protection during laser welding);

Especially preferably, there is a reinforcement by a trapezoidal sheet 11 with a fold edge direction perpendicular to the outer beading, having: a trapezoidal height matched to support the internal trapezoidal surface on the adsorber structure; recesses for 90° reshaping toward the side surfaces; spot welding with the outer shells; the housing half-shells 1a, 1b are welded together, the base-housing connection occurs preferably by welding through of the top and bottom sheet by laser beam deep welding; and/or an optional additional sealing occurs by means of a seal adhesive in glue joint 17 (FIG. 4).

Support frame 15 is disposed in the region of the adiabatic zone between sorption zone 2 and phase change zone 3 and has: a frame with U- or L-shaped angled crosspieces; and/or a frame height matched to the clearance between the interior surfaces of the trapezoidal sheet.

Connections 13, 14 for evacuation and filling have stainless steel connecting pieces welded at the pipe base by means of resistance welding. Alternatively, these can also be screwed-in stainless steel connecting pieces sealed by means of a metal seal. A copper pipe for pinching off and soldering is soldered on.

Water boxes 12 can include an injection-molded and largely hydrolysis-resistant plastic inner part, preferably made of PA or PPS, having: elastomeric seal for sealing against the water box; one fluid connection each; and/or a venting connecting piece each closable by a screw.

An optional contact-pressure cover made of metal (not shown) may have: a cover depth adjusted to support the internal, sealing plastic inner part; guides and support elements for tension bands; tension bands for pressing two water boxes onto the pipe bases of the pipe bundle for sorption zone 2 and phase change zone 3; and/or a clamping beam with tensioning screws for pressing on two opposite water boxes.

FIGS. 16 and 17 show a further embodiment of pipes 4, particularly of pipes 4 of the first region, each of which bear an adsorber structure 5. In this regard, the broad sides of flat pipes 4 are each connected in a planar manner to a molded body 6, such as particularly by gluing. Molded body 6 includes a mixture of adsorption media, in the present case activated charcoal, and binder. An adhesive layer 7 for connecting molded bodies 6 to pipes 4 comprises particularly an elastic adhesive on a silicone base.

In the molded bodies, blind hole-like recesses 6a are formed, which serve as vapor channels for the collective supplying and removing of working media and/or predefined breaking points, by which spalling of the molded bodies from pipe 4 at excessive thermomechanical strain is avoided. The blind holes are regularly distributed over the molded body, such as lined up in rows.

Pipes 4 in end regions 4a extend beyond molded bodies 6 and open into passages 10a of pipe bases 10.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. An adsorber structure for a heat pump, the adsorber structure comprising:
at least one pipe through which a heat transfer fluid is adapted to flow; and
an adsorption medium, whereby a working medium is adapted to be adsorbed and desorbed on the adsorption medium and the adsorption medium is in thermal connection with the pipe,
wherein the adsorption medium is formed as a plurality of molded bodies that are each directly adjacent to a pipe wall of a respective one of the pipes,
wherein each of the plurality of molded bodies has a recess provided in a surface thereof that forms at least partially a vapor channel for the adsorption medium and/or a predetermined breaking point of the molded body.

2. The adsorber structure according to claim 1, wherein the molded bodies have a thickness of at least about 1 mm or of at least about 2 mm.

3. The adsorber structure according to claim 1, wherein the molded bodies are each connected to a respective one of the pipes via an elastic adhesive layer.

4. The adsorber structure according to claim 3, wherein the adhesive layer comprises a silicone base, and wherein the adhesive layer has additives to increase thermal conductivity.

5. The adsorber structure according to claim 1, wherein each pipe is formed as a flat pipe, and wherein the molded bodies are adjacent to a broad side of each flat pipe respectively.

6. The adsorber structure according to claim 1, wherein each pipe is formed substantially as a round pipe or polygon pipe, and wherein each pipe is embedded within two or more molded bodies.

7. The adsorber structure according to claim 6, wherein the molded bodies are formed substantially plate-shaped, and wherein each molded body has a number of indentations for partially enclosing a number of the pipes.

8. The adsorber structure according to claim 1, wherein each pipe is made substantially of an iron-based alloy.

9. The adsorber structure according to claim 8, wherein each pipe is made of a steel or ferritic stainless steel and/or a tinned steel or ferritic stainless steel.

10. A module for a heat pump comprising:
an adsorption/desorption region;
a bundle of fluid-traversable pipes disposed in the adsorption/desorption region;
a housing sealingly enclosing the pipe bundle; and
a movable working medium,
wherein the adsorption/desorption region comprises an adsorber structure according to claim 1.

11. The module according to claim 10, further comprising a condensation/evaporation region in which a bundle of fluid-traversable pipes is disposed, wherein the working medium is adapted to be moved between the adsorption/desorption region and the condensation/evaporation region.

12. The module according to claim 10, wherein a support structure forms a mechanical support of a wall of the housing against an action of an external pressure, wherein the support structure is positioned inside of the housing.

13. The module according to claim 10, wherein the molded bodies form a mechanical support of a wall of the housing against an action of an external pressure.

14. The adsorber structure according to claim 1, wherein each recess extends in a direction that is perpendicular to an extending direction of the pipes.

15. The adsorber structure according to claim 1, further comprising recesses provided in opposing surfaces of each molded body.

16. The module according to claim 12, wherein the support structure is a sheet having longitudinal folds provided therein.

17. The module according to claim 16, wherein the longitudinal folds are oriented perpendicular to longitudinal beads provided in the housing.

18. An adsorber structure for a heat pump, the adsorber structure comprising:
at least one pipe through which a heat transfer fluid is adapted to flow; and
an adsorption medium, whereby a working medium is adapted to be adsorbed and desorbed on the adsorption medium and the adsorption medium is in thermal connection with the pipe,
wherein the adsorption medium is formed as at least one or a plurality of molded bodies that are directly adjacent to a pipe wall of one of the pipes,
wherein at least one of the plurality of molded bodies lies against the pipe wall of the pipe under action of force or frictionally, and
wherein the pipe or molded body has a substantially wedge-shaped cross section, and wherein the pipe or molded body is held in a wedge direction under the action of force.

19. A molded body with an adsorption medium for a heat pump comprising: a mixture with an adsorption medium, heat-conducting additives and a binder, wherein the binder comprises a ceramic binder, particularly based on silicate ceramics.

20. The molded body according to claim 19, wherein the mixture comprises a powder of a sorption-active base material in a particle size in the range between 2 µm and 500 µm, particularly between 5 µm and 100 µm.

21. The molded body according to claim 19, wherein the heat-conducting additives include at least one of expanded graphite, carbon black, BN, SiC, AlN or metallic particles.

* * * * *